United States Patent
Schulz et al.

(10) Patent No.: US 8,200,786 B2
(45) Date of Patent: *Jun. 12, 2012

(54) METHODS AND SYSTEMS FOR DISTRIBUTING SOFTWARE

(75) Inventors: Volker Schulz, Heppenheim (DE); Michael Dohle, Berlin (DE)

(73) Assignee: SAP AG, Walldorf (DE)

( * ) Notice: Subject to any disclaimer, the term of this patent is extended or adjusted under 35 U.S.C. 154(b) by 1258 days.

This patent is subject to a terminal disclaimer.

(21) Appl. No.: 11/647,135

(22) Filed: Dec. 29, 2006

(65) Prior Publication Data

US 2008/0162619 A1    Jul. 3, 2008

(51) Int. Cl.
*G06F 15/16* (2006.01)
(52) U.S. Cl. .................. 709/219; 709/221
(58) Field of Classification Search .......... 709/221, 709/219
See application file for complete search history.

(56) References Cited

U.S. PATENT DOCUMENTS

| | | | |
|---|---|---|---|
| 4,558,413 A | 12/1985 | Schmidt et al. | |
| 5,845,090 A | 12/1998 | Collins, III et al. | |
| 6,138,153 A | 10/2000 | Collins, III et al. | |
| 6,381,742 B2 | 4/2002 | Forbes et al. | |
| 6,618,764 B1 * | 9/2003 | Shteyn | 709/249 |
| 6,810,429 B1 * | 10/2004 | Walsh et al. | 709/246 |
| 6,950,394 B1 | 9/2005 | Chou et al. | |
| 7,673,291 B2 * | 3/2010 | Dias et al. | 717/127 |
| 7,673,297 B1 * | 3/2010 | Arsenault et al. | 717/168 |
| 7,774,300 B2 | 8/2010 | Hsiao et al. | |
| 2005/0091405 A1 * | 4/2005 | Liu et al. | 709/246 |
| 2006/0136907 A1 * | 6/2006 | Bennett et al. | 717/174 |
| 2008/0069352 A1 * | 3/2008 | Poizner et al. | 380/201 |
| 2008/0162620 A1 | 7/2008 | Schulz et al. | |
| 2008/0162621 A1 | 7/2008 | Schulz et al. | |
| 2008/0163200 A1 | 7/2008 | Schulz et al. | |

* cited by examiner

*Primary Examiner* — Tammy Nguyen
(74) *Attorney, Agent, or Firm* — Finnegan, Henderson, Farabow, Garrett & Dunner, LLP

(57) ABSTRACT

Systems and methods consistent with the invention relate to the distribution of software. According to one exemplary embodiment, a method for distributing software from a first system to a second system may comprise determining a software object to be transported and storing the software object in a database. The method may then create, on the first system, a transport request comprising an object list. The method may also define, on the first system, a transport container and include the software object in the transport container. Further, the transport container may be included in the object list of the transport request. The transport request may then be provided to the second system.

17 Claims, 4 Drawing Sheets

METHODS AND SYSTEMS FOR DISTRIBUTING SOFTWARE

FIELD

The present invention relates to methods and systems for distributing software between systems. More particularly, the invention relates to methods and systems for distributing software that may comprise changes, including changes that may concern software components as well as data.

BACKGROUND

Enterprises and organizations of any size often rely on software applications to conduct business. To meet the specific needs of such enterprises and organizations, the built-in functionality and predefined data of software components, and/or the data itself of a software application, may be changed. The process of changing software components and/or data is referred to as customization.

Customization of software components and/or data may usually not, however, be performed while the software system is running. Thus, enterprises may use at least two systems during customization. For instance, the customization may be initially carried out on the first system. This system may be denoted as the customization system. The second system, on the other hand, may be denoted as the productive system. In such an arrangement, changes are transported from the first system to the second system only after those changes have been successfully tested on the first system.

Other arrangements may use at least three systems—a customization system, a quality assurance system, and a productive system. Again, the customization system may be used to customize the applications. The quality assurance system, however, may be used to test the changes to determine that they work correctly. The changes are thus transported from the customization system to the quality assurance system and, then, from the quality assurance system to the productive system. The transport of changes from a first system to another system is referred to herein as software distribution.

Typically, enterprises and organizations use many different software applications. If these software applications are customized centrally on a customization system—for example by a team of administrators—a number of different applications may be distributed from the customization system to at least a further system. Normally, different software applications provide their own distribution tools. Therefore, a number of different distribution tools and distribution methods may be necessary to distribute different software applications. However, by using different distribution tools, there exists a higher risk of making mistakes during the software distribution process.

Accordingly, there exists a need to simplify the distribution of software and data involving different software applications.

SUMMARY OF THE INVENTION

Systems and methods consistent with the invention relate to the distribution of software. According to one exemplary embodiment, a method for distributing software from a first system to a second system may comprise determining a software object to be transported and storing the software object in a database. The method may then create, on the first system, a transport request comprising an object list. The method may also define, on the first system, a transport container and include the software object in the transport container. Further, the transport container may be included in the object list of the transport request. The transport request may then be provided to the second system.

Other objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DESCRIPTION OF THE EMBODIMENTS

Figure 1:
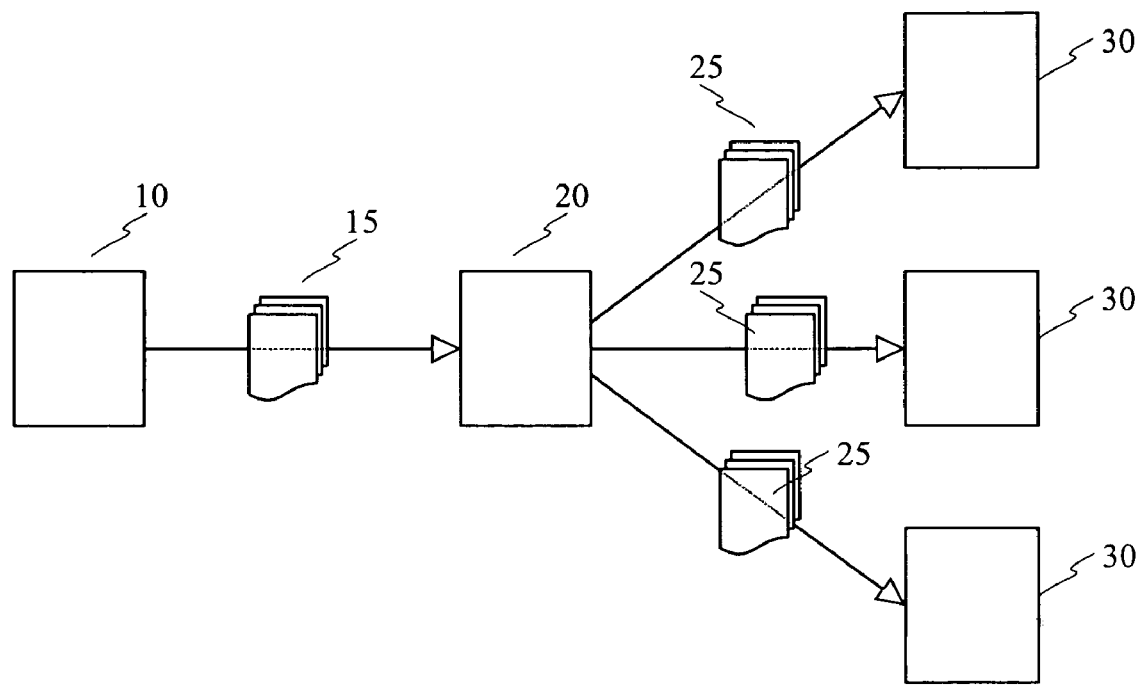
FIG. 1 illustrates an exemplary embodiment of the invention comprising three systems.

The following description refers to the accompanying drawings. Wherever possible, the same reference numbers will be used throughout the drawings to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

FIG. 1 illustrates an exemplary environment consistent with the invention. As shown in FIG. 1, an exemplary embodiment may include three systems 10, 20, an 30. Customization system 10 may be a system in which customization is initially made to a software application. Quality assurance system 20 may be a system in which the changes made in the customization system 10 are tested by using representative test data. Productive system 30 may be a system for normal business operations. Productive system 30 may thus be secure from any changes made in systems 10, 20 until those changes have been tested and are ready for transfer into productive system 30.

Each of systems 10, 20, 30 may represent a heterogeneous system which may comprise computer hardware and computer software. For example, the computer software may implement an enterprise relationship management system or a supply chain management system. Further, systems 10, 20, 30 may be connected by a communication network (not shown) such as an Ethernet, Wireless LAN or other appropriate network. In a further embodiment of the invention, only customization systems 10 and quality assurance system 20 may be connected by a communication network. In such an embodiment, productive system 30 may be separate from the systems 10, 20 for security reasons.

As shown in FIG. 1, productive system 30 may further comprise a plurality of computer hardware systems with the corresponding computer software. This may be necessary when a complex software system needs a separate database server, file server and application server (each not shown). Similarly, while not shown in FIG. 1, customization system 10 and quality assurance system 20 may also comprise a plurality of computer hardware systems and corresponding computer software systems.

As noted above, customization may take place on customization system 10. Customization may comprise, for example, developing new software applications, modifying existing software applications, developing new software modules, modifying existing software modules, generating new master data records and/or changing existing master data records. Further, customization may also comprise modifications to user master data and application data.

Systems 10, 20, and 30 may implement any type of software application. For instance, systems 10, 20, and 30 may include software applications such as native Windows™ applications, JAVA based applications and/or various database management systems. Software applications on systems 10, 20, and 30 may also comprise operating systems for common computer systems as well as operating systems for software controlled devices, such as industrial robots. Further, systems 10, 20, and 30 may include an entire software application or only a part of a software application. A software application or a part of a software application may be referred to as a software object. A software object may also contain master data, user data, application data and/or program code.

As shown in FIG. 1, all changes made in customization system 10 may be recorded to a change request file 15, and then transported to quality assurance system 20 for validation. In alternative embodiments, however, a complete software application containing the changes may be transferred between systems, as opposed to the use of a change request file 15. In any event, quality assurance system 20 may integrate the changes and check the validity and consistency of those changes before transferring them to productive system 30. All changes imported into quality assurance system 20 are then delivered (as illustrated by 25) to productive system 30. Thus, in quality assurance system 20, the functionality, e.g., the changes made in customization system 10, are tested without affecting the productive system 30.

A further embodiment of the invention may comprise only two systems, namely customization system 10 and productive system 30. In such an arrangement, customization system 10 may be used for customization as well as for quality assurance testing, and productive system 30 may be used for actual productive activities.

Figure 2:
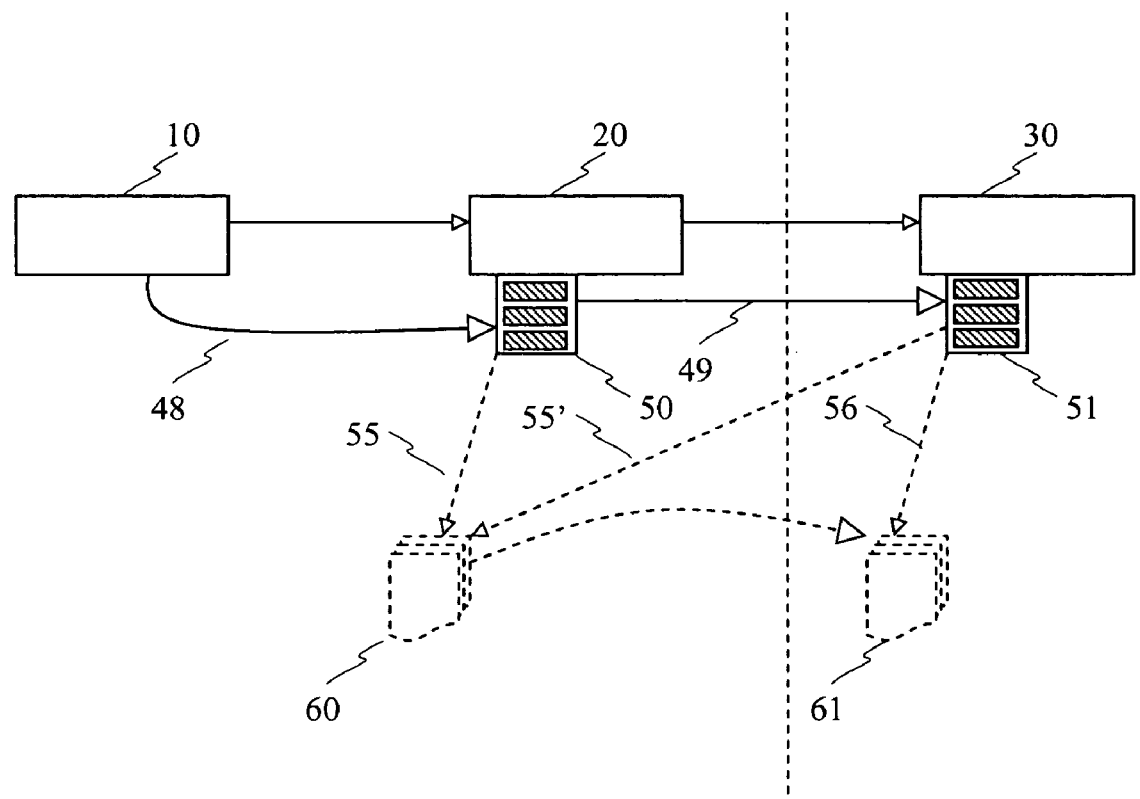
FIG. 2 illustrates an exemplary implementation of the present invention.

FIG. 2 illustrates an exemplary implementation of the present invention. As shown in FIG. 2, customization system 10 may be connected through a communication network to quality assurance system 20. Productive system 30 may be a system without any connection to systems 10 and 20. In FIG. 2, arrows between systems 10, 20 and 30 refer to a transportation route of the changes, e.g., changes are first transported from customization system 10 to quality assurance system 20 and then to productive system 30.

During a first phase, a customization of the software application located on customization system 10 may be performed. When the customization is completed, all of the changes may be released and exported. Releasing and exporting of the changes is described in more detail below with respect to FIG. 4.

During a second phase, the released changes may be added (shown as arrow 48) to an import buffer 50 of quality assurance system 20. The changes may also be stored in a data file 60. If so, import buffer 50 may hold only a reference 55 to data file 60. The changes may, however, be stored in a plurality of files, such as, for example, in a data file and in a control file. The data file may include the changes, such as the software objects to be transported, while the control file may include additional information about the software objects to be transported. Such additional information may comprise methods which may be executed before or after the software objects are imported into a target system, as described in more detail below with respect to FIG. 3. Data file 60 may, in some embodiments, be located on a storage device which belongs to the customization system 10 or to the quality assurance system 20. Data file 60 should be accessible by both the quality assurance system 20 and customization system 10.

Further, during the second phase, the changes which have been added to import buffer 50 (or referenced by import buffer 50) are imported into quality assurance system 20. Thereafter, the changes are activated within quality assurance system 20 if they have been successfully imported. Then, the imported components are then tested in order to verify various requirements, such as the changes made on customization system 20.

The verified changes or a reference to the changes may then be transported, also during the second phase, from import buffer 50 to productive system 30 (as shown by arrow 49). The changes or reference to the changes may be imported into an import buffer 51 which may belong to productive system 30. As a result, import buffer 51 may hold a reference 55' to data file 60, since both quality assurance system 20 and productive system 30 may have access to data file 60.

If productive system 30 has no access to data file 60 (e.g., located with customization system 10 or with quality assurance system 20), then data file 60 may be transported to productive system 30, e.g., by storage means such as compact discs (CD), digital versatile discs (DVD) or other means. Further, the transport of data file 60 may be carried out by a special software program which may be adapted for copying data files from a source location to a target location, whereby the special software program has access to the source location and the target location. The transported data file is shown by item 61 in FIG. 2. Afterwards, a reference 56 of import buffer 51 to data file 60 may be altered to reference the transported data file 61. The changes may then be imported into and activated within productive system 30 as described above for quality assurance system 20.

Figure 3:
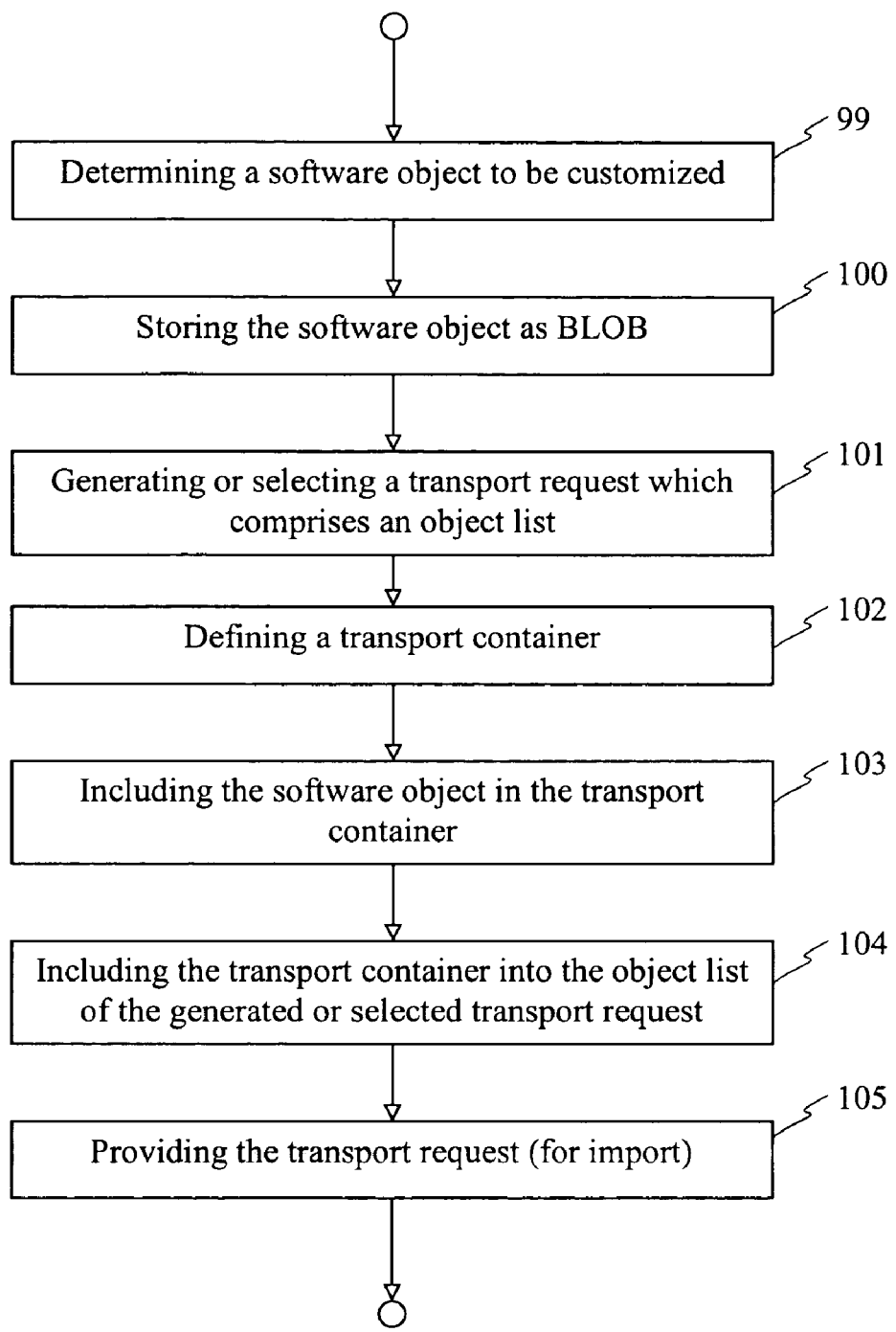
FIG. 3 illustrates an exemplary flow diagram consistent with the present invention.

FIG. 3 illustrates an exemplary flow diagram relating to a software distribution process consistent with the present invention. For example, the process of FIG. 3 may be used as part of the first phase described above with reference to FIG. 2. During customization, software applications may be customized according to given requirements. As described above, customization may be performed on customization system 10. Systems consistent with the invention may record any changes made during customization to store those changes for future use or for transporting the customized software to different systems. Recording and storing changes may be necessary when a large number of developers are customizing the software application in parallel over a long period of time. After finishing the customization, the customized software objects may then be distributed by using the process of FIG. 3.

As shown in FIG. 3, the distribution system may determine a software object to be customized (step 99). This may be done for any software object to be customized. Therefore, step 99 may lead to a number of software objects which are to be customized and thus transported to quality assurance system 20.

Because systems consistent with the invention may transport a software object to systems other than a quality assurance system, however, the description below refers to the destination of a transported software objects as a target system. In FIG. 2, quality assurance system 20 is illustrated as the target system during phase two, while productive system 30 is illustrated as the target system during phase three.

The software objects to be transported may be located on different storage or processing sources of customization system 10. For example, master data records may be stored in a database management system, new software modules may be stored on a file system as well as in a database management system, and JAVA modules or .NET objects and applications may be stored on the file system. Systems and methods consistent with the invention may, though, transport any type of software object irrespective of the storage or processing source.

The distribution system may then store the customized software objects that are located on a file system, for example, JAVA modules or .NET objects, as binary large objects (BLOB) in a database (step 100). For example, when a JAVA module has been changed and stored as a JAVA archive, the JAVA archive which represents the changed software module may be stored as BLOB in the database.

The distribution system may then generate a transport request or, if a transport request was already created before, select a transport request (step 101). A transport request may include an object list identifying the customized software objects, as well as header information containing, e.g., administrative information.

In one embodiment, a transport request may be created automatically for each software object to be transported. However, other embodiments may use an existing transport request. In any case, a user may request the generation of a new transport request for the software objects. Further, if there already exists a transport request containing a particular software object, the distribution system may automatically select that transport request and update the particular software object in the transport request with the corresponding changed software object.

The distribution system may then define or create a transport container (step 102). The number of defined transport containers may match with the number of determined and customized software objects from step 99. The determined and customized software objects may then be included into the defined transport containers (step 103). In one exemplary embodiment, each transport container may hold exactly one software object. The binary large objects stored with the database may be copied from the database into the defined transport containers.

In a further embodiment, the transport container may hold a key of the software object to be transported. The key of the software object determined in processing step 100 may then be inserted into the created transport container of step 103. In one exemplary embodiment, each transport container may hold exactly one key. However, additional information about the software object to be transported may also be stored within the transport container, such as the type of software object.

The transport container holding, for example, a key of the software object to be transported, may then be included into the object list of the generated or selected transport request (step 104).

Thus, a large number of different software objects, such as JAVA modules or .NET objects stored as BLOBs with the database, can be transported from a source system, such as customization system 10, to a target system, such as quality assurance system 20. Further, distribution systems consistent with the invention may thus transport such software objects irrespective of the type of software and irrespective of the respective source locations. Moreover, by storing the software objects as BLOBs in a database has the advantage that in case of system failure the software objects to be transported may be restored by using standard recovery functionality of the database management system.

Each created transport container may further comprise instructions specifying how the included software objects have to be handled during the distribution process. For example, the instructions may comprise methods or references to methods which are executed before the software objects are transported. These methods may include compressing the software objects for the purpose of saving storage space or bandwidth of the communication network. Methods which are executed before the software objects are transported or exported are denoted as 'before-export-methods'. For example, a before-export-method may compress a software object before storing it into the database, with the compressed software object stored as BLOB in the database.

Furthermore, the instructions may also comprise methods which are executed after the software objects are imported into the target system. These methods may include, for example, decompressing the software objects. Methods which are executed after the software objects have been imported are denoted as 'after-import-methods'. Generally, after-import-methods may also be used to activate the imported software objects within the target system. After-import-methods may be located with the target system or implemented by the target system.

Finally, the transport request is provided for further use, e.g. for importing into the target system (step 105). The changes which have been performed during the customization are thus exported. The exporting may store the software objects in a data file on a file system. Thus, the data file may store a number of binary large objects. Additionally, the binary large objects may be compressed before they are stored in the data file. The file system may belong to the system where the changes have been made or may be an external file system or data storage device such as a DVD or CD.

In exemplary embodiments, processing step 105 may further include two sub-steps: locking the transport request, and exporting the software objects. As part of the locking sub-step, distribution systems consistent with the invention may lock the transport request, such that, e.g., the transport request cannot be changed anymore. As part of the exporting sub-step, systems consistent with the invention may export, into the data file, the software objects for which keys are stored within the object. Software objects, e.g., the BLOBs may be exported from a database into the data file.

Providing the transport request may also include importing the transport request into the import buffer of the target system (see, e.g., arrow 48 and buffer 50 in FIG. 2). The data file may be shared by the source system and the target system.

Figure 4:
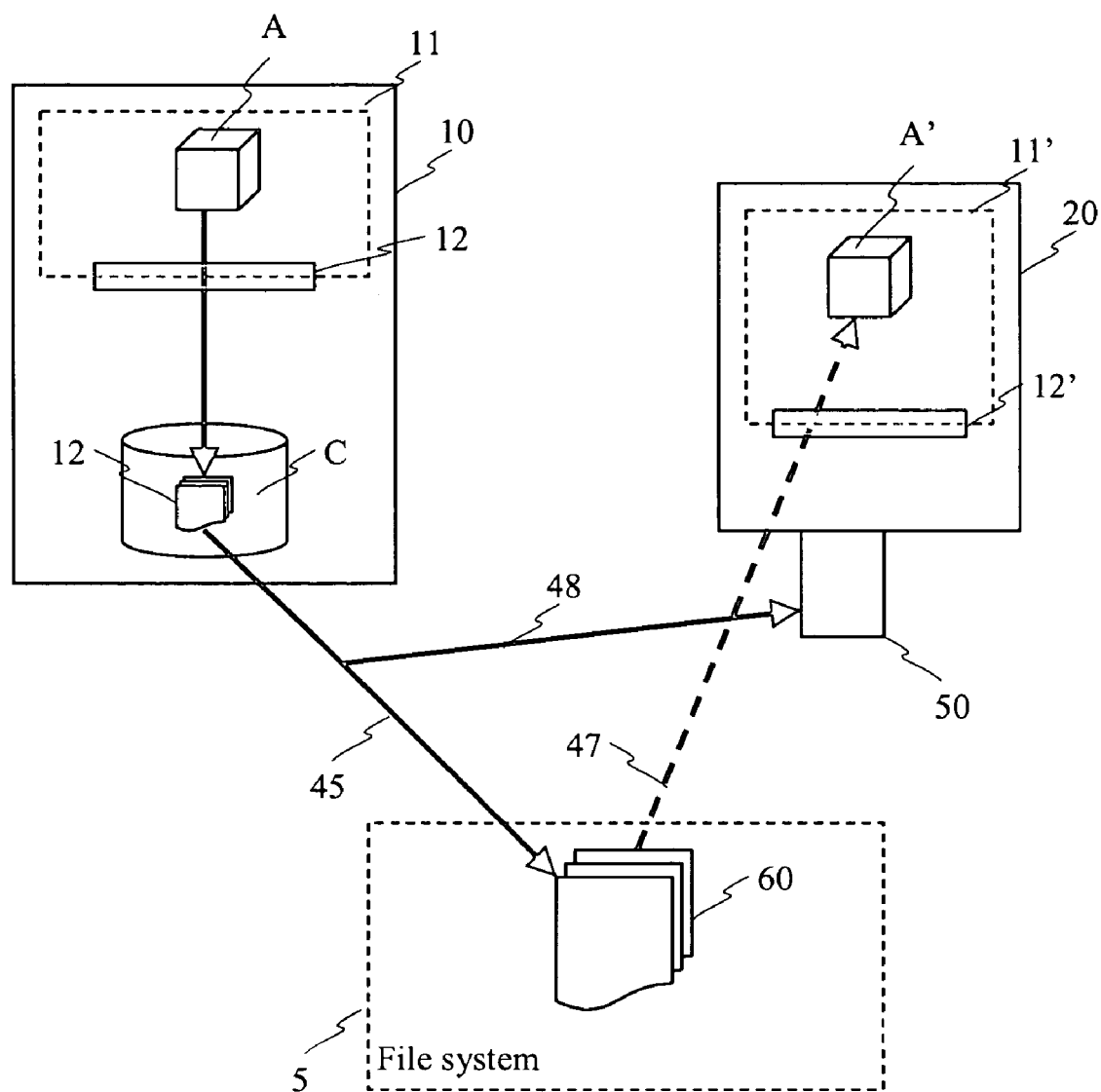
FIG. 4 illustrates an exemplary export and import process consistent with the present invention.

FIG. 4 illustrates an exemplary export and import process consistent with the present invention. As described above, during customization, one or more software objects may be changed to meet given requirements. With respect to FIG. 4, the software object or module A has been so changed. Software module A may belong to software application 11 which may be a Windows™ native application or a JAVA application or any further type of application. Each software application 11 may provide an interface 12 which may be adapted for passing software module A to database C. The software module A may be stored as binary large object 12 with the database C.

The software objects which are to be transported from customization system 10 to quality assurance system 20 are exported 45 from the database C to a data file 60 which may be shared by both systems 10 and 20. Thus, the binary large objects may be stored as binary data in data file 60. The software objects may also be exported into a plurality of single data files. After exporting the software objects, the transport request, which may hold keys of the software objects, may be automatically added 48 to import buffer 50 of target system 20. Thus, import buffer 50 may hold a list of keys of software objects to be imported into the target system. Due to security reasons, the import mechanism may be triggered manually.

During the import, the software objects stored with the data file located with the shared file system 5 corresponding to the transport request are read and copied 47 to the target system. For this purpose the software application 11', which corresponds to source application 11, may provide an interface 12' which is adapted for obtaining the exported software object A. Further, interface 12' may provide functionality for activating the imported software module A'. The software module A' corresponds to the software module A.

Copying into target system 20 may comprise inserting master data records into a database management system, adding software module to the target system and/or inserting software modules into the database management system.

In a further embodiment of the invention, software modules may be stored as BLOBs within the database management system (not shown in FIG. 4) located with target system 20. Special after-import-methods may expand the BLOBs in a predefined way.

Further, the after-import-methods may be performed as a last step of the import or after each imported software object. Yet further, the after-import-methods may activate the imported software objects. The after-import-methods may further call methods which may be provided by interface 12' or by software application 11'.

After software objects have been imported and activated successfully, they may be deleted from import buffer 50. Alternatively, successfully imported software objects may be marked as "already imported" in order to prevent a further import of the objects.

For purposes of explanation only, certain aspects and embodiments are described herein with reference to the components illustrated in FIGS. 1-4. The functionality of the illustrated components may overlap, however, and may be present in a fewer or greater number of elements and components. Further, all or part of the functionality of the illustrated elements may co-exist or be distributed among several geographically dispersed locations. Moreover, embodiments, features, aspects and principles of the present invention may be implemented in various environments and are not limited to the illustrated environments.

Further, the sequences of events described in FIGS. 1-4 are exemplary and not intended to be limiting. Thus, other method steps may be used, and even with the methods depicted in FIGS. 1-4, the particular order of events may vary without departing from the scope of the present invention. Moreover, certain steps may not be present and additional steps may be implemented in FIGS. 1-4. Also, the processes described herein are not inherently related to any particular apparatus and may be implemented by any suitable combination of components.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for distributing software from a first system to a second system, comprising:
   selecting, by a processor of the first system, a software object to be transported, wherein the software object is customized on the first system by making changes to the software object;
   storing the customized software object in a database;
   creating, by the processor of the first system, a transport request having an object list, the object list including an identification of the customized software object;
   creating, by the processor of the first system, a transport container;
   including, by the processor of the first system, the changes made to the software object in the transport container;
   including, by the processor of the first system, the transport container in the object list;
   supplying, by the processor of the first system, the transport request to the second system; and
   testing the customized software object on the second system by integrating the changes included in the transport container.

2. The method of claim 1, wherein the database is located on the first system.

3. The method of claim 1, wherein the software object is stored as a binary large object in the database.

4. The method of claim 1, wherein the transporting further includes:
   storing the software object in the database using a first interface in the first system; and
   activating the obtained software object on the second system using a second interface.

5. The method of claim 1, further comprising:
   creating an archive which contains the software object and storing the archive in a storage device.

6. The method of claim 5, wherein the archive is a JAVA runtime archive.

7. The method of claim 1, wherein the transport container further includes:
   instructions describing how the software object is to be handled during distribution of the software.

8. The method of claim 7, wherein the instructions describe a process executed before the software object is transported.

9. The method of claim 7, wherein the instructions describe a process executed after the software object is transported to the second system.

10. The method of claim 9, wherein the process is executed after the software object is provided via an interface by the second system.

11. The method of claim 1, wherein providing the transport request further includes storing the transport request in a data file that is shared by the first system and the second system.

12. The method of claim 1, wherein providing the transport request further includes storing the software object in a data file that is shared by the first system and the second system.

13. The method of claim 1, wherein providing the transport request further includes at least one of transferring the transport request from the first system to the second system or importing the transport request into the second system.

14. A system for distributing software from a first system to a second system, comprising:
- a processor; and
- a storage unit storing instructions executed by the processor to:
  - select a software object to be transported, wherein the software object is customized on the first system by making changes to the software object;
  - store the selected software object;
  - create, on the first system, a transport request which comprises an object list, the object list including an identification of the customized software object;
  - create, on the first system, a transport container;
  - test the customized software object on the second system by integrating the changes included in the transport container.

15. The system of claim 14, wherein the software object is part of the distributed software.

16. The system of claim 14, wherein the storage unit further stores instructions executed by the processor to create a data file and to store the software object in the data file.

17. A method for distributing software from a first system to a second system, comprising:
- storing a software object to be transported in a database as a binary large object, wherein the software object is customized on the first system by making changes to the software object;
- generating, by a processor of the first system, a transport request having an object list that identifies the software object and identifies the customized software object;
- creating, by a processor of the first system, a transport container including the changes made to the software object in binary large object format, wherein the transport container is included in the object list;
- distributing the transport request to the second system; and
- testing the customized software object on the second system by integrating the changes included in the transport container.

* * * * *